United States Patent [19]

Niino et al.

[11] Patent Number: 5,207,949

[45] Date of Patent: May 4, 1993

[54] HIGHLY CONDUCTIVE POLYOXYMETHYLENE RESIN COMPOSITION CONTAINING CARBON BLACK

[75] Inventors: Masahiko Niino; Shuichi Kudoh, both of Kurashiki, Japan

[73] Assignee: Asahi Kasei Kogyo Kabushiki Kaisha, Osaka, Japan

[21] Appl. No.: 686,135

[22] Filed: Apr. 16, 1991

[30] Foreign Application Priority Data

Apr. 16, 1990 [JP] Japan ................... 2-097547

[51] Int. Cl.$^5$ ............................................. H01B 1/24
[52] U.S. Cl. .................... 252/511; 252/510; 524/495; 524/496; 523/468
[58] Field of Search ................ 252/511, 510; 524/495, 524/496; 523/468

[56] References Cited

U.S. PATENT DOCUMENTS

| | | | |
|---|---|---|---|
| 4,277,577 | 7/1981 | Burg et al. | 524/291 |
| 4,391,741 | 7/1983 | Masamoto et al. | 252/511 |
| 4,395,362 | 7/1983 | Satoh et al. | 252/511 |
| 4,555,357 | 11/1985 | Kausga et al. | 252/511 |
| 4,780,498 | 10/1988 | Goerrissen et al. | 524/590 |
| 4,828,755 | 5/1989 | Kusumgar | 524/495 |
| 4,873,282 | 10/1989 | Yui et al. | 524/496 |
| 4,909,960 | 3/1990 | Watanabe et al. | 252/511 |
| 4,909,961 | 3/1990 | Suzuki et al. | 252/511 |
| 4,933,107 | 6/1990 | Watanabe et al. | 252/511 |
| 5,036,120 | 7/1991 | Orikasa et al. | 525/133 |

FOREIGN PATENT DOCUMENTS

| | | |
|---|---|---|
| 0327384 | 8/1989 | European Pat. Off. . |
| 63-210161 | 8/1988 | Japan . |
| 63-210162 | 8/1988 | Japan . |
| 1-278554 | 11/1989 | Japan . |

*Primary Examiner*—Paul Lieberman
*Assistant Examiner*—Bradley A. Swope

*Attorney, Agent, or Firm*—Birch, Stewart, Kolasch & Birch

[57] ABSTRACT

A highly conductive resin composition comprising:
(a) 55% by weight or more of a polyoxymethylene resin,
(b) 5-15% by weight of a carbon black exhibiting a dibutyl phthalate absorption of 300 ml/100 g or more,
(c) 0.05-10% by weight of an epoxy compound, and
(d) 5-20% by weight of a polyolefin copolymer of ethylene and an α-olefin of 3-6 carbon atoms, or a polyester copolymer having diol residues represented by formula (1) and dicarboxylic acid residues represented by formulae (2), (3) and (4), $$-(O-R-O)- \quad (1)$$

R is an aliphatic hydrocarbon residue of 2-12 carbon atoms, $$-(\underset{\underset{O}{\|}}{C}-R^1-\underset{\underset{O}{\|}}{C})- \quad (2)$$

$R^1$ is an ethylene group, a polymethylene group of 3-6 carbon atoms, or an alkenylene group of 2-6 carbon atoms, $$-(\underset{\underset{O}{\|}}{C}-(CH_2)_l-\underset{\underset{O}{\|}}{C})- \quad (3)$$

$l$ is an integer of 7-24, $$-(\underset{\underset{O}{\|}}{C}-Ph-\underset{\underset{O}{\|}}{C})- \quad (4)$$

Ph is an aromatic hydrocarbon residue, and the molar ratio of $(2)/[(2)+(3)+(4)]$ being 5-100 mole %.

15 Claims, No Drawings

HIGHLY CONDUCTIVE POLYOXYMETHYLENE RESIN COMPOSITION CONTAINING CARBON BLACK

BACKGROUND OF THE INVENTION

1. Field of the Invention

The present invention relates to a carbon black-containing polyoxymethylene resin composition having excellent contact electrical resistance.

2. Related Art Statement

Polyoxymethylenes which are engineering resins having balanced mechanical properties and an excellent sliding property, are in wide use in various mechanical parts, office automation apparatuses, etc., due to the excellent sliding property.

However, as an electrical insulation and being similarly to other resins, polyoxymethylene resins are poor in removability of the static electricity generated by a sliding action or are poor in conductivity and have not been generally used in applications requiring both a sliding property and a high conductivity. In recent years, polyoxymethylene resins containing carbon black have been used in the above applications. However, these resins are insufficient in thermal stability and fluidity as well as in surface smoothness of molded material and accordingly these resins have had problems in that they are unable to exhibit the sliding property inherently possessed by polyoxymethylene resins, they have large contact electrical resistance, and they are unable to exhibit sufficient conductivity.

Various conductive resin compositions containing carbon black have hitherto been known. For example, Japanese Patent Application Kokai No. 8335/1985 discloses a method for producing a conductive resin comprising (a) a thermoplastic resin and (b) a conductive carbon having a dibutyl phthalate absorption of 400 ml/100 g or more and a heavy metal content of 500 ppm or less. Japanese Patent Publication No. 8712/1985 discloses a composition for plating, having a volume electrical resistance of $10^3$ Ω.cm or less, comprising (a) a thermoplastic resin and (b) a carbon black having a dibutyl phthalate absorption of 200 ml/100 g or more. When these techniques are applied to a polyoxymethylene resin, the resulting resin composition has a volume electrical resistance of 200 Ω.cm or less. However, the molded material thereof has insufficient thermal stability and a very rough surface. Accordingly, no molded material as intended by the present invention can be obtained.

Hence, various methods were proposed in order to improve the poor thermal stability of carbon black-containing polyoxymethylene resin. For example, Japanese Patent Publication No. 31736/1986 proposes a method of adding carbon black and an amide compound to a polyoxymethylene resin, and Japanese Patent Publication No. 40708/1986 proposes a method of adding carbon black and a low-density polyethylene to a polyoxymethylene resin. Further, Japanese Patent Application Kokai No. 210161/1988 proposes a method of adding carbon black and an epoxy compound to a polyoxymethylene resin. Furthermore, Japanese Patent Application Kokai No. 210162/1988 proposes a method of adding carbon black, an epoxy compound and an organic phosphorus compound to a polyoxymethylene resin. In these techniques as well, however, improvement in thermal stability is insufficient and improvement in a more important surface roughness property is not at all seen. Accordingly, no molded material as intended by the present invention can be obtained.

Meanwhile, Japanese Patent Application Kokai No. 2785541/1989 proposes the addition of carbon black and an ethylene copolymer to a polyoxymethylene resin to provide a composition with improved fluidity. In this technique, some improvement in surface roughness of molded material is obtained. However, improvement in thermal stability is still insufficient, and moreover, improvements in molded material surface as well as in contact electrical resistance are insufficient.

SUMMARY OF THE INVENTION

The object of the present invention is to provide a resin composition capable of providing a molded material having excellent surface roughness and low contact electrical resistance, which molded material has hitherto been impossible to obtain by the addition of carbon black to a polyoxymethylene resin.

The present inventors have conducted an extensive research in order to obtain a molded material having excellent surface roughness and low contact electrical resistance and as a result, they have completed the present invention which satisfies the above object. According to the present invention there is provided a highly conductive resin composition comprising:

(a) 55% by weight or more of a polyoxymethylene resin, (b) 5–15% by weight of a carbon black exhibiting a dibutyl phthalate absorption of 300 ml/100 g or more, (c) 0.05–10% by weight of an epoxy compound, and (d) 5–20% by weight of a polyolefin copolymer of ethylene and an α-olefin of 3–6 carbon atoms, or a polyester copolymer having diol residues represented by formula (1) and dicarboxylic acid residues represented by formulae (2), (3) and (4),

$$-(O-R-O)- \quad (1)$$

R is an aliphatic hydrocarbon residue of 2–12 carbon atoms,

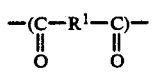

$$-(\underset{\underset{O}{\|}}{C}-R^1-\underset{\underset{O}{\|}}{C})- \quad (2)$$

$R^1$ is an ethylene group, a polymethylene group of 3–6 carbon atoms, or an alkenylene group of 2–6 carbon atoms,

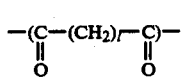

$$-(\underset{\underset{O}{\|}}{C}-(CH_2)_l-\underset{\underset{O}{\|}}{C})- \quad (3)$$

l is an integer of 7–24,

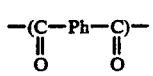

$$-(\underset{\underset{O}{\|}}{C}-Ph-\underset{\underset{O}{\|}}{C})- \quad (4)$$

Ph is an aromatic hydrocarbon residue, and the molar ratio of (2)/[(2)+(3)+(4)] being 5–100 mole %.

DETAILED DESCRIPTION OF PREFERRED EMBODIMENTS

The polyoxymethylene resin constituting the resin composition of the present invention is an oxymethylene homopolymer consisting substantially of an oxymethylene unit, produced from a formaldehyde monomer or a cyclic oligomer such as formaldehyde trimer (trioxane) or formaldehyde tetramer (tetraoxane), or an oxymethylene copolymer containing 0.1-20% by weight of an oxyalkylene unit of 2-8 carbon atoms, produced from the above monomer or oligomer and a cyclic ether such as ethylene oxide, propylene oxide, epichlorohydrin, 1,3-dioxolane, formal of glycol or formal of diglycol. The polyoxymethylene resin further includes a branched oxymethylene copolymer having a branched molecular chain and a block copolymer comprising an oxymethylene repeating unit (50% by weight or more) and another block.

The carbon black used in the present invention is a conductive carbon black which has small particle diameters or a large surface area and a well developed chain structure and provides a dibutyl phthalate (hereinafter referred to as DBP) absorption of 300 ml/100 g or more as measured by ASTM D 2415-65T. A carbon black having particle diameters of 0.05 μm or less is preferable. A carbon black having a DBP absorption of 400 ml/100 g or more is more preferable.

Specific examples of the carbon black include Ketjen black EC (DBP absorption: 350 ml/100 g), EC-DJ 600 (DBP absorption: 480 ml/100 g) (these are products of Lion Akzo), and Printex XE 2 (DBP absorption: 370 ml/100 g) (a product of Degussa). It is possible to use two or more such carbon blacks in combination.

The carbon black is used in the resin composition of the present invention in an amount of 5-15% by weight, preferably 7-10% by weight. When the amount is smaller than 5% by weight or larger than 15% by weight, the resulting resin composition has increased contact electrical resistance.

The epoxy compound used in the resin composition of the present invention is preferably a mono- or polyfunctional glycidyl derivative, or a compound obtained by oxidizing a compound having unsaturation(s) to form epoxy group(s) therein.

Such a glycidyl derivative or a compound includes, for example, 2-ethylhexyl glycidyl ether, 2-methyloctyl glycidyl ether, lauryl glycidyl ether, stearyl glycidyl ether, behenyl glycidyl ether, ethylene glycol diglycidyl ether, polyethylene glycol diglycidyl ether (ethylene oxide units: 2-30), propylene glycol diglycidyl ether, polypropylene glycol diglycidyl ether, (propylene oxide units: 2-30), neopentyl glycol diglycidyl ether, 1,6-hexanediol diglycidyl ether, glycerine diglycidyl ether, glycerine triglycidyl ether, trimethylolpropane diglycidyl ether, trimethylolpropane triglycidyl ether, bisphenol A diglycidyl ether, hydrogenated bisphenol A diglycidyl ether, sorbitan monoester diglycidyl ether, sorbitan monoester triglycidyl ether, pentaerythritol triglycidyl ether, pentaerythritol tetraglycidyl ether, diglycerine triglycidyl ether, diglycerine tetraglycidyl ether, a condensate between cresol novolac and epichlorohydrin (epoxy equivalent: 100-400, softening point: 20-150° C.), glycidyl methacrylate, glycidyl ester of coconut fatty acid and glycidyl ester of soybean fatty acid. Of these epoxy compounds, particularly preferable are a condensate of cresol novolac and epichlorohydrin, and trimethylolpropane triglycidyl ether.

These epoxy compounds may be used alone or in combination of two or more. The amount of the epoxy compound used is 0.05-10% by weight based on the total weight of the resin composition. When the amount is smaller than 0.05% by weight or larger than 10% by weight, the resulting resin composition has increased contact electrical resistance. The amount is preferably 1.0-5.0% by weight.

The resin composition of the present invention can further comprise a curing agent for an epoxy resin. As the curing agent for an epoxy resin, there is generally used a basic nitrogen compound or a basic phosphorus compound. There can also be used any other compound having an epoxy-curing action (including a cure-accelerating action).

Specific examples of the curing agent for an epoxy resin include imidazole; substituted imidazoles such as 1-hydroxyethyl-2-methylimidazole, 1-cyanoethyl-2-heptadecylimidazole, 1-vinyl-2-phenylimidazole and the like; aliphatic secondary amines such as octylmethylamine, laurylmethylamine and the like; aromatic secondary amines such as diphenylamine, ditolylamine and the like; aliphatic tertiary amines such as trilaurylamine, dimethyloctylamine, dimethylstearylamine, tristearylamine and the like; aromatic tertiary amines such as tritolylamine, triphenylamine and the like; morpholine compounds such as cetylmorpholine, octylmorpholine, p-methylbenzylmorpholine and the like; strongly basic nitrogen compounds such as dicyandiamide, melamine, urea and the like; addition products obtained by adding an alkylene oxide to dicyandiamide, melamine, urea or the like (the number of moles added: 1-20 moles); and phosphorus compounds such as triphenylphosphine, methyldiphenylphosphine, tritolylphosphine and the like. Of these curing agents for epoxy resin, particularly preferable are triphenylphosphine and an addition product obtained by adding ethylene oxide and propylene oxide to dicyandiamide.

The curing agent for an epoxy resin can be added in an amount of 0.1-10% by weight based on the total weight of the resin composition. When the amount is smaller than 0.1% by weight or larger than 10% by weight, the resulting resin composition has increased contact electrical resistance. The amount is preferably 0.5-5.0% by weight.

In the polyolefin copolymer of ethylene and an α-olefin of 3-6 carbon atoms constituting the resin composition of the present invention, the α-olefin is propylene, 1-butene, 1-pentene, 1-hexene or the like. The polyolefin copolymer has an MI of preferably 30 g/10 min or more, more preferably 40-100 g/10 min as measured by ASTM D 1238/57T, condition E, in view of the surface smoothness of the resulting resin composition. The polyolefin copolymer preferably has an ethylene content of 20 mole % or less.

The polyester copolymer used in the present resin composition, comprises diol residues represented by formula (1) and dicarboxylic acid residues represented by formulae (2), (3) and (4) wherein the molar ratio of (2)/[(2)+(3)+(4)] is 5-100 mole %.

The alcohols which are materials of the diol residues (1) constituting the polyester copolymer, specifically include ethylene glycol, propanediol-(1,2), propanediol-(1,3), 2,2'-dimethylpropanediol-(1,3), butanediol-(1,4), butanediol-(1,3), pentanediol-(1,5), hexanediol-(1,6), heptanediol-(1,7), octanediol-(1,8), nonanediol-(1,9), decanediol-(1,10), dodecanediol-(1,12), pinacol, cyclopentane-1,2-diol, cyclohexane-1,2-diol, cyclohexane-1,4-diol and the like. Of these alcohols, particularly preferable are ethylene glycol, propanediol and butanediol.

The dicarboxylic acids which are materials of dicarboxylic acid residues (2), (3) and (4), include, for example, aliphatic saturated dicarboxylic acids such as succinic acid, glutaric acid, adipic acid, pimelic acid, suberic acid, azelaic acid, sebacic acid and the like; aliphatic unsaturated dicarboxylic acids such as maleic acid, fumaric acid and the like; and aromatic dicarboxylic acids such as phthalic acid, isophthalic acid, terephthalic acid, naphthalene-1,5-dicarboxylic acid, naphthalene-2,6-dicarboxylic acid, naphthalene-2,7-dicarboxylic acid, 4,4-dicarboxy-diphenyl, bis(4-carboxyphenyl)-methane, bis(4-carboxyphenyl)-ethane, bis(4-carboxyphenyl)-ether, 1,2-bis-(4-carboxyphenyl)ethane, anthracene-5,10-dicarboxylic acid, anthracene-1,4-dicarboxylic acid, anthracene-1,5-dicarboxylic acid, anthracene-2,6-dicarboxylic acid and the like. Of these dicarboxylic acids, preferable are succinic acid, glutaric acid, adipic acid, pimelic acid, terephthalic acid and isophthalic acid.

The polyester copolymer can be produced by a known process, for example, a process described in U.S. Pat. No. 3023192, comprising heating a dicarboxylic acid or a dimethyl ester thereof and a diol to a temperature of 150-260° C. in the presence of an organic titanate catalyst.

It is preferable that the polyester copolymer used in the present resin composition contain a titanium compound (a catalyst residue) in an amount as small as possible. This is because the titanium compound significantly deteriorates the thermal stability of the polyoxymethylene resin component during molding. The titanium content in the polyester copolymer is preferably 0.05% by weight or less, more preferably 0.03% by weight or less.

In the polyester copolymer of the present resin composition, the dicarboxylic acid components comprise 5 mole % or more, preferably 30 mole % or more of an aliphatic dicarboxylic acid having 4-8 carbon atoms. The content of this aliphatic dicarboxylic acid having 4-8 carbon atoms has an influence on the glass transition temperature (about 0° to 150° C.) of the polyester elastomer. However, it does not follow that any polyester having said glass transition temperature can be used. The monomers constituting the polyester are also important.

The polyester copolymer used in the present resin composition has a number-average molecular weight of preferably 2,000-50,000, more preferably 5,000-30,000.

The polyester copolymer includes a segmented polyester copolymer and a random copolymer in view of the molecular arrangement. Any of these can be used in the present resin composition, but the latter (random copolymer) is preferable.

The polyester copolymer is preferably a polyester copolymer containing in the molecule no segment (segment block) consisting of a repeating unit of an ester between (a) a single dicarboxylic acid having a number-average molecular weight larger than 2,000, preferably larger than 1,000 and (b) a diol.

The polyester copolymer can be preferably produced by, for example, a process disclosed in Japanese Patent Publication No. 41551/1987, comprising reacting a dimethyl dicarboxylate with a diol of excessive amount to effect complete demethylation and then adding a dicarboxylic acid to effect dehydration. There is also a process disclosed in Japanese Patent Publication No. 17359/1985, comprising reacting a dicarboxylic acid with a diol to effect dehydration in one step (a direct process).

The polyester copolymer desirably has an acid value of 100 meq/kg or less, preferably 50 meq/kg or less.

The acid value refers to mmol equivalents of KOH consumed when 1 kg of the polyester copolymer is dissolved in benzyl alcohol and neutralized with a 1/10N aqueous KOH solution using phenolphthalein as an indicator.

A higher acid value indicates that the amount of the carboxylic acid group present at the terminal(s) of the polyester copolymer is larger.

The amount of said carboxylic acid group is preferably small because the group lowers the thermal decomposition-starting temperature of the present resin composition.

It is necessary that the $\alpha$-olefin copolymer or the polyester copolymer be used in an amount of 5-20% by weight based on the total weight of the resin composition. When the amount is smaller than 5% by weight or larger than 20% by weight, no satisfactory contact electrical resistance can be obtained. The amount is preferably 7-15% by weight.

In the present invention, the $\alpha$-olefin copolymer or the polyester copolymer can be used in combination of two or more such copolymers.

The resin composition of the present invention can be prepared by melt-kneading necessary components at a temperature equal to or higher than the melting point of the polyoxymethylene resin using a known apparatus generally used in kneading of a resin melt, such as kneader, roll mill, extruder or the like. As the melt kneading apparatus, an extruder is most appropriate in view of the oxygen shielding, working environment, etc. There are various types of extruders such as single-screw type, double-screw type, vented type, non-vented type and the like; any of these extruders can be used for preparation of the present resin composition. The mixing temperature is equal to or higher than the melting point of the polyoxymethylene resin used, and extrusion can be effected sufficiently at temperature ranges of 180-240° C. generally employed. The time required for kneading is sufficiently 30 seconds to 3 minutes which is about the same as the time required for extruding the polyoxymethylene resin alone.

In the above, the kneading conditions for preparing the present resin composition have been shown. The kneading method and conditions are not restricted to the above, and there can be used any known method and conditions used for preparing a polyoxymethylene resin composition.

The resin composition of the present invention can further comprise additives generally used in plastics, such as oxidation inhibitor or/and light stabilizer or/and inorganic filler or/and pigment. The resin composition can also comprise a polyamide, melamine, a melamine derivative, dicyandiamide, calcium carboxylate, etc. all generally used in polyoxymethylene resins.

The present resin composition can be molded into melt molded materials such as compression molded material, injection molded material and extrusion molded material. Specific examples of the molded materials are injection molded materials such as gear, fly wheel, roller, bearing and the like, extrusion molded materials such as pellet, round rod, sheet, film and the like, and compression molded materials such as sheet, film and the like, all requiring conductivity. Injection molded materials and extrusion molded materials are preferable. Of the extrusion molded materials, a sheet and a film are preferable. A film of 1-200 μm in thickness is more preferable, and a film of 10-100 μm in thickness is particularly preferable. When the film thickness is larger than 200 μm, the film is brittle and tends not to have sufficient strength. When the film thickness is smaller than 1 μm, the film tends to have no uniform thickness and tends to be anisotropic.

The molded materials of the present invention are specifically used as molded members having very low contact electrical resistance, such as membrane switch, key switch, drum flange for copying machine, drum gear for copying machine, charger for copying machine, igniting member for electronic lighter, and the like. Of these applications, particularly preferable are membrane switch, key switch and drum gear for copying machine.

The present invention has made it possible to provide a carbon black-containing polyoxymethylene resin composition of high conductivity, excellent surface smoothness and low contact electrical resistance, which has hitherto been desired, and accordingly has a very high industrial value.

The molded materials of the present invention exhibits excellent effects in polyoxymethylene applications of recently increasing demand, requiring both sliding property and high conductivity, such as membrane switch, key switch, drum gear for copying machine, and the like.

The present invention is hereinafter described specifically by way of Examples and Comparative Examples. However, the present invention is in no way restricted to them.

The test items in Examples and Comparative Examples were measured as follows.

(1) Volume electrical resistance

Electrodes were applied to a sample at the sample portions coated with a silver paste; a varaible DC constant current source (5964 manufactured by Electronics) was connected to the electrodes and a constant current of 1 mA was passed through the sample; the resulting voltage was measured using TR 8651 manufactured by Advantest whereby the volume electrical resistance of the sample was determined. In this case, the pressure applied to the sample and the electrodes was set at 500 g/cm$^2$, and the electrode-silver paste contact resistance was set at 10$^{-4}$ Ω.cm or less.

(2) Contact electrical resistance

The volume electrical resistance including contact electrical resistance, of a sample was measured according to the above method, with no silver paste coated on the sample; and the contact electrical resistance of the sample was calculated from the following formula.

Contact electrical resistance = (volume electrical resistance including contact electrical resistance) − (volume electrical resistance)

(3) Center line average roughness (Ra)

This was measured in accordance with JIS B 0601-1976, using a surface roughness tester (a tester by tracer method) manufactured by Tokyo Seimitsu. [A silver paste is coated on a sample in the measurement of volume electrical resistance. Ra was measured at the silver paste-coated surfaces (front and back).]

(4) Thermal decomposition-starting temperature

A thermobalance (TGA) containing 30 mg of a sample was subjected to a temperature elevation at a rate of 10° C./min in a nitrogen atmosphere, to measure a temperature at which the sample showed a weight reduction of 1 mg.

(5) Acid value 1 kg of a polyester copolymer was dissolved in benzyl alcohol and neutralized with a 1/10N aqueous KOH solution using phenolphthalein as an indicator. The mmol equivalent of the KOH consumed is an acid value of the copolymer.

EXAMPLES 1-16, COMPARATIVE EXAMPLES 1-11

A powder of a both terminals-acetylated polyoxymethylene homopolymer was prepared according to a known process described in U.S. Pat. No. 2998409. The polymer had an intrinsic viscosity of 1.2 as measured at 60° C. by dissolving 0.1% by weight of the polymer in a p-chlorophenol solution containing 2% by weight of α-pinene. The polymer also had an MI of 9.0 g/10 min. This polyoxymethylene homopolymer powder was dried at 80° C. for 3 hours and mixed with other components shown double-screw vented extruder set at 190° C. (screw revolution: 50 rpm, discharge: 3 kg/hr). The resin temperature was 195° C. during the kneading. The pellets obtained from the cutter were again dried by a drier of 80° C. for 3 hours and then molded into a sample of 100×100×10 mm by a 3-ounce molding machine (die temperature: 80° C., cooling time: 20 seconds). The molded sample was measured for volume electrical resistance and contact electrical resistance, center line surface roughness and thermal decomposition-starting temperature. The results of Examples 1-16 are shown in Tables 1-3. The results of Comparative Examples 1-11 are shown in Tables 4 and 5.

EXAMPLES 17-22, COMPARATIVE EXAMPLES 12-15

A polyoxymethylene copolymer (ethylene oxide: 2.8%) was prepared according to a known method described in U.S. Pat. No. 3027352. The polymer had an intrinsic viscosity of 1.1 and an MI of 10.0 g/10 min. The polymer was dried at 80° C. for 3 hours and mixed with other components shown in Tables 6 and 7, and melt kneaded under the same extrusion conditions as mentioned above. (Incidentally, the polyester random copolymers used in Tables 6 and 7 were prepared from monomers shown in Tables 8 and 9, according to a direct method described in Japanese Patent Publication No. 17359/1985.) The pellets obtained from the cutter were again dried by a drier of 80° C. for 3 hours and molded into a sample of 100×100×10 mm by a 3-ounce molding machine (die temperature: 80° C., cooling time: 20 seconds). The molded sample was measured for volume electrical resistance and contact electrical resistance, center line surface roughness and thermal decomposition-starting temperature. The results of Examples 17-22 are shown in Table 6. The results of Comparative Examples 12-15 are shown in Table 7.

TABLE 1

| Composition* | | | |
| --- | --- | --- | --- |
| Polyoxymethylene resin | Carbon black | Epoxy compound | Curing agent for epoxy resin |

TABLE 1-continued

| Example | (wt. %) | (wt. %) | (wt. %) | (wt. %) |
|---|---|---|---|---|
| 1 | Homopolymer (89.95) | Printex XE2 (5) | Trimethylolpropane triglycidyl ether (0.05) | — |
| 2 | Homopolymer (88.95) | Printex XE2 (5) | Trimethylolpropane triglycidyl ether (0.05) | Adduct of dicyandiamide with ethylene oxide (4 moles) (1.0) |
| 3 | Homopolymer (83.95) | Printex XE2 (10) | Trimethylolpropane triglycidyl ether (0.05) | Adduct of dicyandiamide with ethylene oxide (4 moles) (1.0) |
| 4 | Homopolymer (78.95) | Printex XE2 (15) | Trimethylolpropane triglycidyl ether (0.05) | Adduct of dicyandiamide with ethylene oxide (4 moles) (1.0) |
| 5 | Homopolymer (82.0) | Printex XE2 (10) | Trimethylolpropane triglycidyl ether (2.0) | Adduct of dicyandiamide with ethylene oxide (4 moles) (1.0) |
| 6 | Homopolymer (74.0) | Printex XE2 (10) | Trimethylolpropane triglycidyl ether (10.0) | Adduct of dicyandiamide with ethylene oxide (4 moles) (1.0) |

| Example | Composition* Copolymer (monomer composition) (wt. %) | Center line surface roughness ($\mu$) Front | Center line surface roughness ($\mu$) Back | Volume electrical resistance ($\Omega \cdot cm$) | Contact electrical resistance ($\Omega \cdot cm$) | Thermal decomposition-starting temperature (°C.) |
|---|---|---|---|---|---|---|
| 1 | Ethylene 10 mole % / 1-Butene 90 mole % / MI = 30 (5) | 0.6 | 0.6 | 200 | 1000 | 230 |
| 2 | Ethylene 10 mole % / 1-Butene 90 mole % / MI = 30 (5) | 0.5 | 0.5 | 200 | 800 | 240 |
| 3 | Ethylene 10 mole % / 1-Butene 90 mole % / MI = 30 (5) | 0.6 | 0.6 | 10 | 900 | 235 |
| 4 | Ethylene 10 mole % / 1-Butene 90 mole % / MI = 30 (5) | 0.7 | 0.7 | 3 | 1000 | 230 |
| 5 | Ethylene 10 mole % / 1-Butene 90 mole % / MI = 30 (5) | 0.5 | 0.5 | 10 | 500 | 240 |
| 6 | Ethylene 10 mole % / 1-Butene 90 mole % / MI = 30 (5) | 0.4 | 0.4 | 10 | 600 | 245 |

TABLE 2

| Example | Composition* Polyoxymethylene resin (wt. %) | Carbon black (wt. %) | Epoxy compound (wt. %) | Curing agent for epoxy resin (wt. %) |
|---|---|---|---|---|
| 7 | Homopolymer (84.95) | Printex XE2 (5) | Trimethylolpropane triglycidyl ether (0.05) | — |
| 8 | Homopolymer (74.95) | Printex XE2 (5) | Trimethylolpropane triglycidyl ether (0.05) | — |
| 9 | Homopolymer (82.9) | Printex XE2 (10) | Trimethylolpropane triglycidyl ether | Adduct of dicyandiamide with |

TABLE 2-continued

| Example | Polyoxymethylene resin (wt. %) | Carbon black (wt. %) | Epoxy compound (wt. %) | Curing agent for epoxy resin (wt. %) |
|---|---|---|---|---|
| | | | (2.0) | ethylene oxide (0.1) |
| 10 | Homopolymer (73) | Printex XE2 (10) | Trimethylolpropane triglycidyl ether (2.0) | Adduct of dicyandiamide with ethylene oxide (10) |
| 11 | Homopolymer (83) | Printex XE2 (10) | Trimethylolpropane triglycidyl ether (2.0) | — |
| 12 | Homopolymer (89.95) | Printex XE2 (5) | Trimethylolpropane triglycidyl ether (0.05) | — |

| Example | Composition* Copolymer (monomer composition) (wt. %) | Center line surface roughness ($\mu$) Front | Center line surface roughness ($\mu$) Back | Volume electrical resistance ($\Omega \cdot cm$) | Contact electrical resistance ($\Omega \cdot cm$) | Thermal decomposition-starting temperature (°C.) |
|---|---|---|---|---|---|---|
| 7 | Ethylene 10 mole % / 1-Butene 90 mole % / MI = 30 (10) | 0.4 | 0.4 | 200 | 700 | 232 |
| 8 | Ethylene 10 mole % / 1-Butene 90 mole % / MI = 30 (20) | 0.5 | 0.5 | 220 | 800 | 234 |
| 9 | Ethylene 10 mole % / 1-Butene 90 mole % / MI = 30 (5) | 0.5 | 0.5 | 10 | 550 | 238 |
| 10 | Ethylene 10 mole % / 1-Butene 90 mole % / MI = 30 (5) | 0.5 | 0.5 | 10 | 550 | 242 |
| 11 | Ethylene 10 mole % / 1-Butene 90 mole % / MI = 30 (5) | 0.7 | 0.7 | 10 | 950 | 235 |
| 12 | Ethylene 5 mole % / 1-Butene 95 mole % / MI = 30 (5) | 0.6 | 0.6 | 200 | 1200 | 230 |

TABLE 3

| Example | Polyoxymethylene resin (wt. %) | Carbon black (wt. %) | Epoxy compound (wt. %) | Curing agent for epoxy resin (wt. %) |
|---|---|---|---|---|
| 13 | Homopolymer (89.95) | Printex XE2 (5) | Trimethylolpropane triglycidyl ether (0.05) | — |
| 14 | Homopolymer (89.95) | Printex XE2 (5) | Trimethylolpropane triglycidyl ether (0.05) | — |
| 15 | Homopolymer (89.95) | Printex XE2 (5) | Trimethylolpropane triglycidyl ether (0.05) | — |
| 16 | Homopolymer (89.95) | Printex XE2 (5) | Trimethylolpropane triglycidyl ether (0.05) | — |

| Example | Composition* Copolymer (monomer composition) (wt. %) | Center line surface roughness ($\mu$) Front | Center line surface roughness ($\mu$) Back | Volume electrical resistance ($\Omega \cdot cm$) | Contact electrical resistance ($\Omega \cdot cm$) | Thermal decomposition-starting temperature (°C.) |
|---|---|---|---|---|---|---|
| 13 | Ethylene 10 mole % / 1-Butene 90 mole % / MI = 40 (5) | 0.3 | 0.3 | 200 | 500 | 232 |
| 14 | Ethylene 10 mole % | 0.3 | 0.3 | 200 | 490 | 232 |

TABLE 3-continued

|   | | | | | | | |
|---|---|---|---|---|---|---|---|
|   | 1-Butene | 90 mole % | | | | | |
|   | MI = 100 | | | | | | |
|   | (5) | | | | | | |
| 15 | Ethylene | 20 mole % | 0.6 | 0.6 | 200 | 1100 | 230 |
|   | 1-Butene | 80 mole % | | | | | |
|   | MI = 30 | | | | | | |
|   | (5) | | | | | | |
| 16 | Ethylene | 25 mole % | 0.7 | 0.7 | 200 | 1400 | 230 |
|   | 1-Butene | 75 mole % | | | | | |
|   | MI = 30 | | | | | | |
|   | (5) | | | | | | |

TABLE 4

| Comparative Example | Composition* | | | |
|---|---|---|---|---|
| | Polyoxymethylene resin (wt. %) | Carbon black (wt. %) | Epoxy compound (wt. %) | Curing agent for epoxy resin (wt. %) |
| 1 | Homopolymer (95) | Printex XE2 (5) | — | — |
| 2 | Homopolymer (94.95) | Printex XE2 (5) | Trimethylolpropane triglycidyl ether (0.05) | — |
| 3 | Homopolymer (90.95) | Printex XE2 (4) | Trimethylolpropane triglycidyl ether (0.05) | — |
| 4 | Homopolymer (74.95) | Printex XE2 (20) | Trimethylolpropane triglycidyl ether (0.05) | — |
| 5 | Homopolymer (89.97) | Printex XE2 (5) | Trimethylolpropane triglycidyl ether (0.03) | — |
| 6 | Homopolymer (78) | Printex XE2 (5) | Trimethylolpropane triglycidyl ether (12) | — |

| Comparative Example | Composition* Copolymer (monomer composition) (wt. %) | | Center line surface roughness (μ) | | Volume electrical resistance (Ω·cm) | Contact electrical resistance (Ω·cm) | Thermal decomposition-starting temperature (°C.) |
|---|---|---|---|---|---|---|---|
| | | | Front | Back | | | |
| 1 | — | | 1.5 | 1.5 | 200 | 3500 | 190 |
| 2 | — | | 1.0 | 1.0 | 200 | 3000 | 210 |
| 3 | Ethylene 1-Butene MI = 30 (5) | 10 mole % 90 mole % | 0.6 | 0.6 | 600 | 2500 | 230 |
| 4 | Ethylene 1-Butene MI = 30 (5) | 10 mole % 90 mole % | 1.2 | 1.2 | 1 | 2200 | 190 |
| 5 | Ethylene 1-Butene MI = 30 (5) | 10 mole % 90 mole % | 1.0 | 1.0 | 200 | 2300 | 228 |
| 6 | Ethylene 1-Butene MI = 30 (5) | 10 mole % 90 mole % | 1.1 | 1.1 | 210 | 2500 | 231 |

TABLE 5

| Comparative Example | Composition* | | | |
|---|---|---|---|---|
| | Polyoxymethylene resin (wt. %) | Carbon black (wt. %) | Epoxy compound (wt. %) | Curing agent for epoxy resin (wt. %) |
| 7 | Homopolymer (91.95) | Printex XE2 (5) | Trimethylolpropane triglycidyl ether (0.05) | — |
| 8 | Homopolymer (69.95) | Printex XE2 (5) | Trimethylolpropane triglycidyl ether (0.05) | — |
| 9 | Homopolymer | Toka black | Trimethylolpropane | |

TABLE 5-continued

| | | (89.95) | #3750<br>(DBP: 245 ml/<br>100 g)<br>(a product of<br>TOKAI<br>CARBON<br>CO., LTD.)<br>(5) | triglycidyl ether<br>(0.05) | |
|---|---|---|---|---|---|
| 10 | | Homopolymer<br>(87.0) | Printex XE2<br>(10) | Trimethylolpropane<br>triglycidyl ether<br>(2.0) | Adduct of<br>dicyandiamide with<br>ethylene oxide<br>(4 moles)<br>(1.0) |
| 11 | | Homopolymer<br>(90.0) | Printex XE2<br>(5) | — | — |

| Comparative Example | Composition*<br>Copolymer<br>(monomer composition)<br>(wt. %) | Center line surface roughness (μ) Front | Center line surface roughness (μ) Back | Volume electrical resistance ($\Omega \cdot$ cm) | Contact electrical resistance ($\Omega \cdot$ cm) | Thermal decomposition-starting temperature (°C.) |
|---|---|---|---|---|---|---|
| 7 | Ethylene 10 mole %<br>1-Butene 90 mole %<br>MI = 30<br>(3) | 1.0 | 1.0 | 200 | 2200 | 228 |
| 8 | Ethylene 10 mole %<br>1-Butene 90 mole %<br>MI = 30<br>(25) | 1.0 | 1.0 | 300 | 2300 | 231 |
| 9 | Ethylene 10 mole %<br>1-Butene 90 mole %<br>MI = 30<br>(5) | 0.6 | 0.6 | $1 \times 10^5$ | 5000 | 231 |
| 10 | — | 1.0 | 1.0 | 10 | 2800 | 233 |
| 11 | Ethylene 10 mole %<br>1-Butene 90 mole %<br>MI = 30<br>(5) | 1.2 | 1.2 | 10 | 3300 | 200 |

TABLE 6

| | Composition* | | | |
|---|---|---|---|---|
| Example | Polyoxymethylene resin (wt. %) | Carbon black (wt. %) | Epoxy compound (wt. %) | Curing agent for epoxy resin (wt. %) |
| 17 | Copolymer<br>(84) | EC-DJ 600<br>(8) | Condensate of<br>cresol novolac and<br>epichlorohydrin<br>(epoxy equivalent: 300<br>softening point: 120° C.)<br>(2) | Triphenylphosphine<br>(1) |
| 18 | Copolymer<br>(79) | EC-DJ 600<br>(8) | Condensate of<br>cresol novolac and<br>epichlorohydrin<br>(epoxy equivalent: 300<br>softening point: 120° C.)<br>(2) | Triphenylphosphine<br>(1) |
| 19 | Copolymer<br>(69) | EC-DJ 600<br>(8) | Condensate of<br>cresol novolac and<br>epichlorohydrin<br>(epoxy equivalent: 300<br>softening point: 120° C.)<br>(2) | Triphenylphosphine<br>(1) |
| 20 | Copolymer<br>(69) | EC-DJ 600<br>(8) | Condensate of<br>cresol novolac and<br>epichlorohydrin<br>(epoxy equivalent: 300<br>softening point: 120° C.)<br>(2) | Triphenylphosphine<br>(1) |
| 21 | Copolymer<br>(79) | EC-DJ 600<br>(8) | Condensate of<br>cresol novolac and<br>epichlorohydrin<br>(epoxy equivalent: 300<br>softening point: 120° C.)<br>(2) | Triphenylphosphine<br>(1) |
| 22 | Copolymer | EC-DJ 600 | Condensate of | Triphenylphosphine |

TABLE 6-continued

|  | (79) | (8) | cresol novolac and epichlorohydrin (epoxy equivalent: 300 softening point: 120° C.) (2) | (1) |
|---|---|---|---|---|

| Example | Composition* Copolymer (polymer No.) (wt. %) | Center line surface roughness (μ) Front | Center line surface roughness (μ) Back | Volume electrical resistance (Ω · cm) | Contact electrical resistance (Ω · cm) | Thermal decomposition-starting temperature (°C.) |
|---|---|---|---|---|---|---|
| 17 | A (5) | 0.2 | 0.2 | 6 | 320 | 240 |
| 18 | B (10) | 0.1 | 0.1 | 6 | 180 | 243 |
| 19 | C (20) | 0.2 | 0.2 | 6 | 220 | 245 |
| 20 | D (20) | 0.1 | 0.1 | 6 | 190 | 245 |
| 21 | E (10) | 0.05 | 0.05 | 6 | 120 | 250 |
| 22 | F (10) | 0.1 | 0.1 | 6 | 200 | 240 |

TABLE 7

| Comparative Example | Composition* Polyoxymethylene resin (wt. %) | Carbon black (wt. %) | Epoxy compound (wt. %) | Curing agent for epoxy resin (wt. %) |
|---|---|---|---|---|
| 12 | Copolymer (79) | EC-DJ 600 (8) | Condensate of cresol novolac and epichlorohydrin (epoxy equivalent: 300, softening point: 120° C.) (2) | Triphenylphosphine (1) |
| 13 | Copolymer (79) | EC-DJ 600 (8) | Condensate of cresol novolac and epichlorohydrin (epoxy equivalent: 300, softening point: 120° C.) (2) | Triphenylphosphine (1) |
| 14 | Copolymer (79) | EC-DJ 600 (8) | Condensate of cresol novolac and epichlorohydrin (epoxy equivalent: 300, softening point: 120° C.) (2) | Triphenylphosphine (1) |
| 15 | Copolymer (79) | EC-DJ 600 (8) | Condensate of cresol novolac and epichlorohydrin (epoxy equivalent: 300, softening point: 120° C.) (2) | Triphenylphosphine (1) |

| Comparative Example | Composition* Copolymer (polymer No.) (wt. %) | Center line surface roughness (μ) Front | Center line surface roughness (μ) Back | Volume electrical resistance (Ω · cm) | Contact electrical resistance (Ω · cm) | Thermal decomposition-starting temperature (°C.) |
|---|---|---|---|---|---|---|
| 12 | G (10) | 1.0 | 1.0 | 6 | 2300 | 245 |
| 13 | H (10) | 1.2 | 1.2 | 6 | 2500 | 240 |
| 14 | I (10) | 1.5 | 1.5 | 6 | 3100 | 238 |
| 15 | J (10) | 0.8 | 0.8 | 6 | 2100 | 243 |

TABLE 8

| Properties of polyester random copolymers | | | | | | | Number-average molecular weight of polyester copolymer | Acid value of polyester copolymer (meq/kg) |
|---|---|---|---|---|---|---|---|---|
| Types and mole %'s of diol(s) and dicarboxylic acids [diol(s): 100 moles, dicarboxylic acids: 100 moles, total: 200 moles] | | | | | | | | |
| A | Terephthalic acid (75) | Isophthalic acid (20) | Succinic acid (1) | Glutaric acid (1) | Adipic acid (3) | 1,4-Butane-diol (100) | 2,000 | 500 |

TABLE 8-continued

Properties of polyester random copolymers

| | Types and mole %'s of diol(s) and dicarboxylic acids [diol(s): 100 moles, dicarboxylic acids: 100 moles, total: 200 moles] | | | | | Number-average molecular weight of polyester copolymer | Acid value of polyester copolymer (meq/kg) |
|---|---|---|---|---|---|---|---|
| B | | | Adipic acid (50) | Glutaric acid (50) | 1,4-Butane-diol (50) | Ethylene glycol (50) | 4,800 | 200 |
| C | Terephthalic acid (20) | Isophthalic acid (60) | Succinic acid (20) | 1,6-Hexane-diol (100) | | | 19,000 | 52 |
| D | Terephthalic acid (35) | Isophthalic acid (35) | Succinic acid (30) | Ethylene glycol (10) | Nonanediol (10) | Dodecanediol (80) | 29,000 | 34 |
| E | Terephthalic acid (10) | Isophthalic acid (10) | Glutaric acid (80) | Ethylene glycol (100) | | | 50,000 | 20 |
| F | Terephthalic acid (10) | Isophthalic acid (10) | Glutaric acid (80) | Ethylene glycol (100) | | | 1,000 | 10 |

TABLE 9

Properties of polyester random copolymers

| | Types and mole %'s of diol and dicarboxylic acids [diol: 100 moles, dicarboxylic acids: 100 moles, total: 200 moles] | | | | Number-average molecular weight of polyester copolymer |
|---|---|---|---|---|---|
| G | Terephthalic acid (20) | Isophthalic acid (60) | Succinic acid (20) | Polyethylene glycol (Mn: 800) (100) | 19,000 |
| H | Terephthalic acid (20) | Isophthalic acid (60) | Succinic acid (20) | Triethylene glycol (100) | 19,000 |
| I | Terephthalic acid (45) | Isophthalic acid (55) | | Triethylene glycol (100) | 50,000 |
| J | Terephthalic acid (45) | Isophthalic acid (51) | Adipic acid (4) | 1,4-Butane-diol (100) | 51,000 |

EXAMPLES 23-27, COMPARATIVE EXAMPLES 16 AND 17

The pellets obtained in Example 21 were passed through an extruder, Extruder XP of Meltex, set at 50 rpm (screw revolution) and 200° C. (cylinder and nozzle temperatures) and provided with a T-die (0.4 mm in thickness) head, to prepare films of different thicknesses with the aid of a releasing paper. The films were measured for center line surface roughness, volume electrical resistance in thickness direction and contact electrical resistance. The results are shown in Tables 10 and 11. As a result, the film having a thickness larger than 200 μ showed easy breakage when bent, and the film having a thickness smaller than 1 μ had an insufficient strength. Incidentally, tensile strength was measured in accordance with ASTM D 638.

TABLE 10

| Example | Thickness of film (μ) | Center line surface roughness (μ) Front | Center line surface roughness (μ) Back | Volume electrical resistance (Ω · cm) | Contact electrical resistance (Ω · cm) | Tensile strength* (in orientation direction) (Kg/cm²) |
|---|---|---|---|---|---|---|
| 23 | 200 | 0.05 | 0.05 | 6 | 120 | 380 |
| 24 | 150 | 0.05 | 0.05 | 6 | 120 | 400 |
| 25 | 100 | 0.05 | 0.05 | 6 | 120 | 410 |
| 26 | 10 | 0.05 | 0.05 | 6 | 120 | 410 |
| 27 | 1 | 0.05 | 0.05 | 6 | 120 | 385 |

*Strength when a film has been pulled in the orientation direction used during molding.

TABLE 11

| Comparative Example | Thickness of film (μ) | Center line surface roughness (μ) Front | Center line surface roughness (μ) Back | Volume electrical resistance (Ω · cm) | Contact electrical resistance (Ω · cm) | Tensile strength* (in orientation direction) (Kg/cm²) |
|---|---|---|---|---|---|---|
| 16 | 200 | 0.05 | 0.05 | 6 | 120 | 250 |
| 17 | 0.8 | 0.05 | 0.05 | 6 | 120 | 300 |

*Strength when a film has been pulled in the orientation direction used during molding.

What is claimed is:

1. A highly conductive resin composition comprising:
   (a) 55%–89.95% by weight of a polyoxymethylene resin, (b) 5–15% by weight of a carbon black exhibiting a dibutyl phthalate absorption of 300–480 ml/100 g, (c) 0.05–10% by weight of an epoxy compound containing at least one glycidyl group or an epoxy compound obtained by oxidizing a compound having unsaturation to form an epoxy group therein, and (d) 5–20% by weight of a polyolefin copolymer of ethylene and an α-olefin of 3–6 carbon atoms, or a polyester copolymer having diol residues represented by formula (1) and dicarboxylic acid residues represented by formulae (2) and (4), $$-(O-R-O)- \quad (1)$$

R is an aliphatic hydrocarbon residue of 2–12 carbon atoms, $$-(\underset{O}{\overset{\|}{C}}-R^1-\underset{O}{\overset{\|}{C}})- \quad (2)$$

$R^1$ is an ethylene group, a polymethylene group of 3–4 carbon atoms, or an alkylene group of 2–4 carbon atoms, $$-(\underset{O}{\overset{\|}{C}}-Ph-\underset{O}{\overset{\|}{C}})- \quad (4)$$

Ph is an aromatic hydrocarbon residue, and the molar ratio of (2)/[(2)+(4)] being 5–100 mole %.

2. The resin composition according to claim 1, wherein the dibutyl phthalate absorption of the carbon black is 400–480 ml/100 g.

3. The resin composition according to claim 1, wherein the mono- or polyfunctional glycidyl derivative of epoxy compound (c) is a condensate of cresol novolac and epichlorohydrin (epoxy equivalent: 100–400, softening point: 20–150° C.) or trimethylolpropane triglycidyl ether.

4. The resin composition according to claim 1, which further comprises a curing agent for an epoxy resin.

5. The resin composition according to claim 4, wherein the curing agent for an epoxy resin is triphenylphosphine.

6. The resin composition according to claim 1, wherein the ethylene content of the polyolefin copolymer is 20 mole % or less.

7. The resin composition according to claim 1, wherein the polyolefin copolymer has an MI of 40–100 g/10 min.

8. The resin composition according to claim 1, wherein the polyester copolymer is a polyester random copolymer in which the acid components thereof comprise 30–80 mole % of an aliphatic dicarboxylic acid of 4–6 carbon atoms.

9. The resin composition according to claim 1, wherein the polyester copolymer has an acid value of 50-20 meq/kg.

10. A molded material obtained by subjecting the resin composition of claim 1 to compression molding.

11. A molded material obtained by subjecting the resin composition of claim 1 to injection molding.

12. A molded material obtained by subjecting the resin composition of claim 1 to extrusion molding.

13. The molded material according to any one of claims 10–12 having a film of 1–200μ in thickness.

14. The molded material according to any one of claims 10–12 having a film of 10–100μ in thickness.

15. The molded material according to claim 11, wherein the molded material is a gear, a fly wheel, a roller or a bearing.

* * * * *